W. M. BURTON.
MANUFACTURE OF GASOLENE.
APPLICATION FILED JULY 3, 1912.
1,049,667.
Patented Jan. 7, 1913.
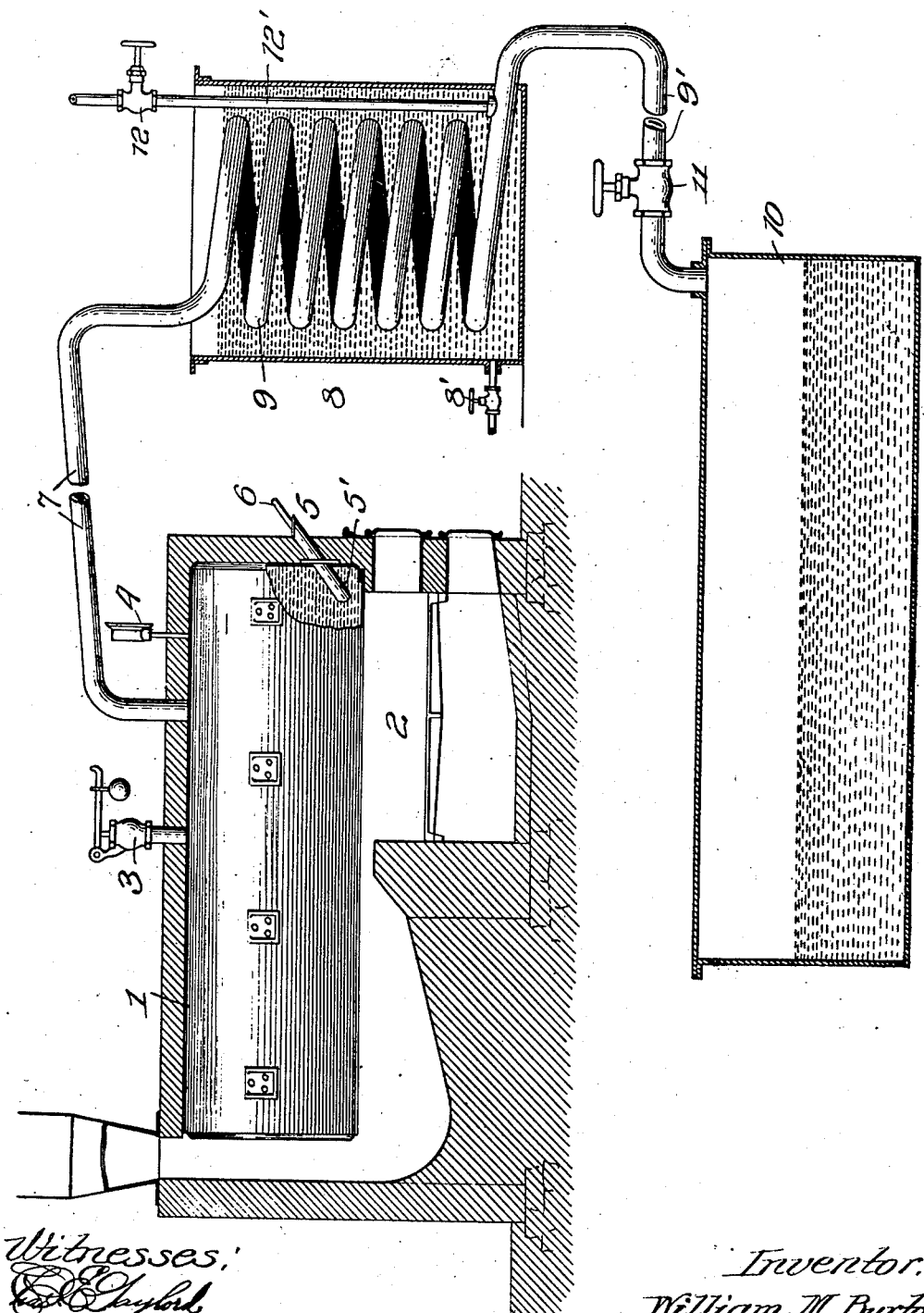

UNITED STATES PATENT OFFICE.

WILLIAM M. BURTON, OF CHICAGO, ILLINOIS, ASSIGNOR TO STANDARD OIL COMPANY, OF WHITING, INDIANA, A CORPORATION OF INDIANA.

MANUFACTURE OF GASOLENE.

1,049,667.   Specification of Letters Patent.   Patented Jan. 7, 1913.

Application filed July 3, 1912. Serial No. 707,424.

*To all whom it may concern:*

Be it known that I, WILLIAM M. BURTON, a citizen of the United States, residing at Chicago, in the county of Cook and State of Illinois, have invented a new and useful Improvement in the Manufacture of Gasolene, of which the following is a specification.

My invention relates to an improvement in the treatment of the high boiling-point residual portions, and particularly the residue of the distillation of the paraffin group or series of petroleum after the lower boiling point distillates have been removed to obtain a low boiling-point product of the same group or series.

The great and growing demand during the past ten years for gasolene has induced a large increase in the supply by improvements in the method of distilling from crude petroleum the naphthas, the boiling points of which range from about 75° F. to 350° F. This leaves the illuminating oils, the boiling points of which range from about 350° F. to about 600° F., and the lubricating oils and waxes and, as residue, fuel-oil and gas-oil, with boiling-points ranging from about 600° F. to 700° F. The increasing demand for gasolene has induced attempts to obtain it from this residue; but these attempts, while successful in producing gasolene, have invariably, so far as I am aware, as the result of lowering the boiling point, changed the general formula of the paraffin group ($C_nH_{2n}+2$) to that of the ethylene group ($C_nH_{2n}$), rendering the product unmarketable because undesirable by reason of its offensive odor, for the removal of which no suitable treatment has been found.

A known method of treating the fuel and gas oils, forming the aforesaid residue of distillation of the paraffin series of petroleum, for obtaining therefrom a low boiling-point product involves subjecting the liquid to be treated to a temperature sufficiently high to secure so-called destructive distillation, and conducting the resultant vapors through a condenser by way of a pipe or conduit connecting it with the still, but having a loaded valve interposed in the conduit between the condenser and still to maintain pressure in the latter of the vapors of distillation on the liquid. While this practice produces the desired effect of lowering the boiling point of the liquid, the condensed product, for reasons which I do not attempt to explain, is found to have been converted into distillates belonging to the objectionable ethylene group, referred to.

The object of my invention is to provide a method of treating the aforesaid residue of the paraffin group of petroleum by distillation and condensation of the vapors thereof, whereby the resultant product of low boiling-points shall be of the same paraffin series and thus free from the objection mentioned or, in other words, whereby conversion of the petroleum of that series into products belonging to the ethylene series shall be avoided. This object I accomplish by raising the boiling point of the liquid residue and increasing the heat-influence thereon while undergoing distillation by maintaining back-pressure on said liquid of the vapors arising therefrom by distillation, as has hitherto been done as aforesaid, and also maintaining the vapors themselves under pressure throughout their course from the still through the condenser and while undergoing condensation.

Suitable apparatus devised for the practise of my improvement is illustrated in the accompanying drawing by a broken view in vertical longitudinal section, diagrammatic in character, showing parts in elevation.

A boiler-like holder 1 for the liquid residue to be treated surmounts a fire-chamber 2 and is shown to be equipped with a safety-valve 3 to relieve excessive pressure in the holder; a pressure-gage 4, and a temperature-gage 5, the preferable construction of which is that illustrated of a tube $5^1$ extending inclinedly into the holder through its head and closed at its inner end, for containing mercury, or by preference oil, and adapted to have withdrawably inserted into it through its outer, open end a suitable thermometer 6 for immersion into the contents of the tube under subjection to the heat in the holder. A conduit 7 leads from the top of the holder and inclines upwardly therefrom, to induce the return-flow into it of unvaporized portions of the liquid, to a condenser 8, the tank of which is shown to be provided with a lower draw-off cock $8^1$. The condenser-coil 9 discharges at its lower end through a pipe-extension $9^1$ thereof, of any desired length, into a receiver 10 for the products of condensation. In this pipe, and thus beyond the discharge-end of the coil, is contained a shut-off valve 11, and it is desirable to equip the coil with a relief-valve 12, shown on the upper end of a pipe 12¹ rising from near the lower end of the coil through the top of the condenser-tank, for relieving the gas-pressure which is liable to accumulate in the coil and obstruct the action of the apparatus.

The valve 11 is normally closed. From a supply of the aforesaid liquid residue contained in the holder 1, heat from the fire-chamber distills the volatile constituents, and the resultant vapors course through the conduit 7 and coil 9, wherein they are condensed. With the valve 11 tightly closed against the escape of the products of condensation, the vapors of distillation accumulate and thereafter exert a high pressure amounting from about 4 to about 5 atmospheres upon the liquid in the holder or still, raising the boiling-point from 500° F.–600° F. to 750°F.–800° F.; and this pressure of the vapors combined with their contained heat greatly enhances the conversion of the high boiling members of the paraffin series into low boiling members of the same series. The valve 11 is opened from time to time to draw off the products of condensation into the receiver 10. In fact, the intervals of drawing off should be sufficiently frequent to avoid filling the coil with liquid, for the most satisfactory operation of the apparatus. The resultant gasolene is a product belonging to the paraffin series, the same as the petroleum residue from which it was distilled. I do not herein account for the effect of the back-pressure from the extreme end of the condenser-coil upon the contents of the holder 1 in preventing transformation of the paraffin series into the objectionable ethylene series, but it is the fact that such effect ensues.

What I claim as new and desire to secure by Letters Patent is:—

1. The method of treating the liquid-portions of the paraffin-series of petroleum-distillation having a boiling point upward of 500° F. to obtain therefrom low-boiling-point products of the same series, which consists in distilling at a temperature of from about 650 to about 850° F. the volatile constituents of said liquid, conducting off and condensing said constituents, and maintaining a pressure of from about 4 to about 5 atmospheres on said liquid of said vapors throughout their course to and while undergoing condensation.

2. The method of treating the liquid-portions of the paraffin-series of petroleum-distillation having a boiling point of upward of 500° F. to obtain therefrom low-boiling-point products of the same series, which consists in distilling off at a temperature of from about 650 to about 850° F. the volatile constituents of said liquid, conducting off and condensing said constituents, maintaining a pressure of from about 4 to about 5 atmospheres on said liquid of said vapors throughout their course to and while undergoing condensation, and releasing from time to time accumulations of gas from the products of condensation.

WILLIAM M. BURTON.

In presence of—
O. C. AVISUS,
R. A. SCHAEFER.